(12) United States Patent
Harrison

(10) Patent No.: US 6,869,042 B2
(45) Date of Patent: Mar. 22, 2005

(54) SYSTEM FOR AIRBORNE LAUNCH OF AN AIRCRAFT FROM A LARGER CARRIER AIRCRAFT

(75) Inventor: Richard G Harrison, Preston (GB)

(73) Assignee: BAE System plc, London (GB)

( * ) Notice: Subject to any disclaimer, the term of this patent is extended or adjusted under 35 U.S.C. 154(b) by 0 days.

(21) Appl. No.: 10/472,230

(22) PCT Filed: Feb. 20, 2002

(86) PCT No.: PCT/GB02/00719

§ 371 (c)(1),
(2), (4) Date: Sep. 22, 2003

(87) PCT Pub. No.: WO02/076826

PCT Pub. Date: Oct. 3, 2002

(65) Prior Publication Data

US 2004/0089767 A1 May 13, 2004

(30) Foreign Application Priority Data

Mar. 21, 2001 (GB) .............................. 0106990

(51) Int. Cl.⁷ .............................................. B64C 37/02
(52) U.S. Cl. ............................ 244/2; 244/4 R; 244/63; 244/110 R; 244/135 A; 244/137.4
(58) Field of Search ........................ 244/4 R, 63, 110 R, 244/110 E, 110 F, 135 A, 137.4, 2

(56) References Cited

U.S. PATENT DOCUMENTS

| 4,678,141 | A | * | 7/1987 | Sarrantonio | 244/2 |
|---|---|---|---|---|---|
| 4,757,959 | A | * | 7/1988 | Schroder et al. | 244/2 |
| 5,000,398 | A | * | 3/1991 | Rashev | 244/2 |
| 5,131,438 | A | * | 7/1992 | Loucks | 141/1 |
| 5,465,923 | A | * | 11/1995 | Milner | 244/2 |
| 5,906,336 | A | | 5/1999 | Eckstein | |
| 6,540,179 | B2 | * | 4/2003 | Henderson | 244/135 A |

FOREIGN PATENT DOCUMENTS

| DE | 911457 | 7/1949 |
|---|---|---|
| EP | 472 927 | 3/1992 |
| GB | 676430 | 7/1952 |
| SU | 1821428 | 6/1993 |
| WO | WO 00/54433 | 9/2000 |

* cited by examiner

Primary Examiner—J. Woodrow Eldred
(74) Attorney, Agent, or Firm—Nixon & Vanderhye P.C.

(57) ABSTRACT

A system for launching, refuelling and recovering in flight an aircraft (10) such as an unmanned aerial vehicle (UAV) from a larger carrier aircraft (16) comprising a holder (22) on the carrier aircraft (16) to which the UAV (10) is detachably connectable and an extendable and retractable refuelling device (23, 24) on the carrier aircraft (16) detachably connectable to the UAV (10) whereby to launch the UAV it is disconnected from the holder (22), the refuelling device (23, 24) is extended with the UAV connected thereto to cause the UAV to trail behind the carrier aircraft and the UAV is then disconnected from the refuelling device.

11 Claims, 1 Drawing Sheet

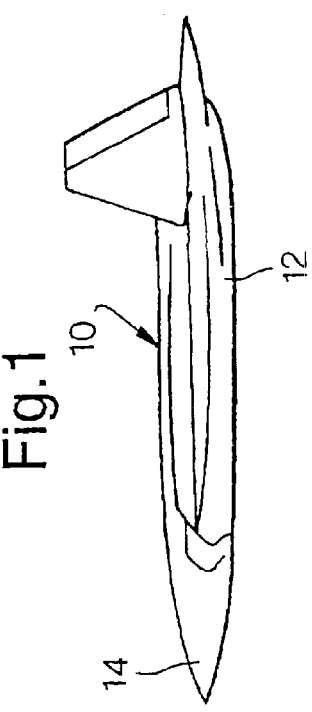
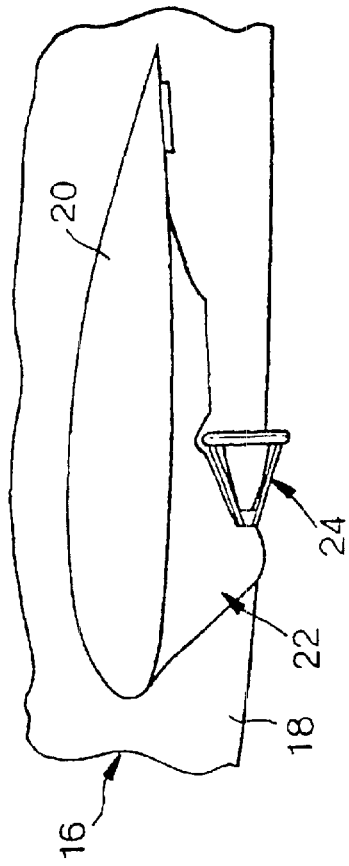
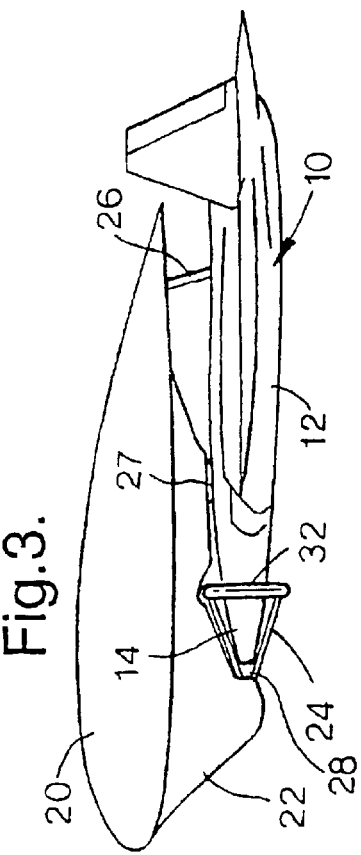
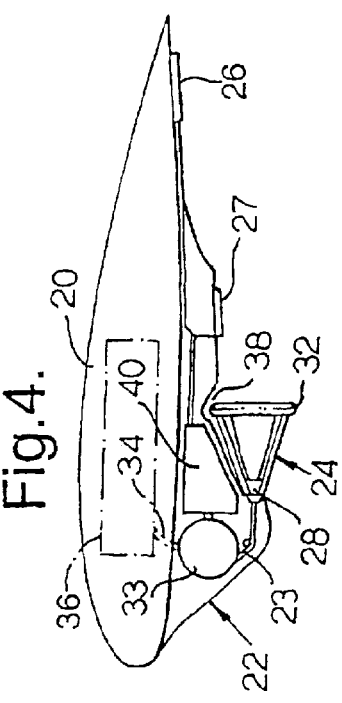
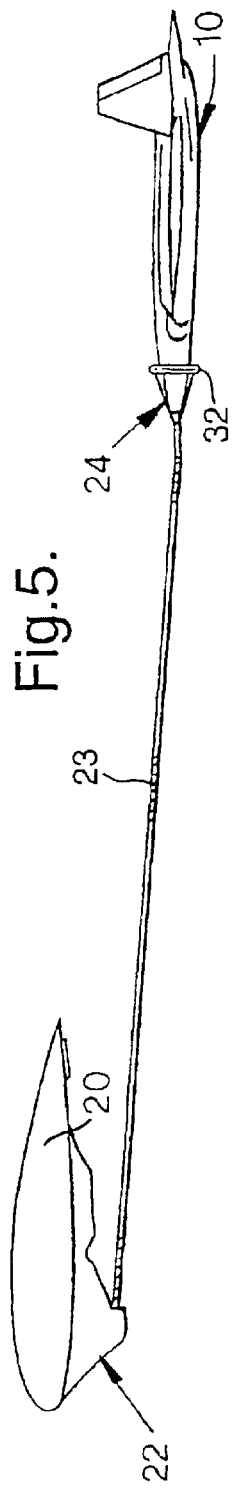

SYSTEM FOR AIRBORNE LAUNCH OF AN AIRCRAFT FROM A LARGER CARRIER AIRCRAFT

This application is the U.S. national phase of international application PCT/GB02/00719, filed Feb. 20, 2002, which designated the U.S.

The invention relates to a system for an airborne launch of an aircraft from a larger carrier Aircraft. In particular, but not exclusively, the invention is concerned with a system for the launching, refuelling and recovering of an unmanned aerial vehicle (UAV).

At present, the majority of UAVs are ground launched and require fuel to get to and from their location. The present invention is concerned with the airborne launch of a UAV or other aircraft from a larger carrier aircraft.

According to the invention, there is provided a system for the airborne launch refuelling and recovery of an aircraft from/by a larger carrier aircraft and for refuelling and recovering the aircraft, the system comprising a holder on the carrier aircraft to which the aircraft is detachably connectable, and an extendible and retractable refuelling device mounted on or in the holder detachably connectable to the aircraft, whereby to launch the aircraft the aircraft is disconnected from the holder and the refuelling device is extended with the aircraft detachably connected thereto to cause the aircraft to trail behind the carrier aircraft and the refuelling device is disconnected from the trailing aircraft, the system enabling the aircraft to be refuelled in flight by connecting the aircraft in flight to the extended refuelling device and passing fuel from the carrier aircraft to the aircraft through the refuelling device, the aircraft also being recoverable by connecting the aircraft in flight to the extended refuelling device, retracting the refuelling device with the aircraft connected thereto and reconnecting the aircraft to the carrier aircraft.

Such an arrangement obviates any need for the aircraft to have its own undercarriage, which significantly reduces its weight and so improves its flight endurance and/or speed, which is particularly advantageous where the aircraft is an unmanned aerial vehicle.

The refuelling device is preferably in the form of a hose having means such as a drogue thereon for connection to the aircraft. The hose may be wound on the drum, the drum being rotatable to enable the hose to unwind therefrom to extend the refuelling device.

The holder may have a latching device thereon for detachably connecting the aircraft to the holder. Preferably, a drive unit is provided for operating the drum and/or the or each latching device on the holder.

In the preferred embodiment a latching device is provided for detachably connecting the aircraft to the refuelling device.

The holder may be detachably connectable to the carrier aircraft, which allows any courier aircraft easily to be fitted for launching, refuelling and recovering in flight unmanned aerial vehicles.

A system in accordance with the invention will now be described by way of example with reference to the accompanying drawings in which:

FIG. 1 is a side view of typical UAV;

FIG. 2 is a side view of part of the larger carrier aircraft showing a pod arranged beneath a wing and an associated refuelling drogue;

FIG. 3 is a view similar to FIG. 2 but showing a side removed from the pod so as to illustrate diagrammatically internal components;

FIG. 4 shows the UAV of FIG. 1 releasably connected to the carrier aircraft and having a nose section located in the drogue; and FIG. 5 shows the hose extended from the pod of a carrier aircraft with the UAV located in the drogue ready for launch.

The UAV of FIG. 1 is of generally known kind and it is pointed out that the present invention is not limited to the launch, refuelling or recovery of a UAV of that specific form. The UAV, indicated generally at 10, has a fuselage 12 having a nose section 14.

Looking at FIG. 2, a carrier aircraft 16 has a fuselage 18 and wings 20, only one of which is shown in FIG. 2. The lower side of the wing 20 carries a pod 22 containing a refuelling hose 23 having a free-end connected to a drogue 24. The pod 22 in the present example constitutes the aforesaid holder although the term "holder" is not limited to a pod-like construction.

As shown in FIG. 3, the UAV 10 can be mounted beneath the wing 20 with its nose section 14 positioned within the drogue 24 and with its fuselage 12 releasably connected to the wing 20 by means of a latching device 26 on the wing 20 and another latching device 27 on the pod 22.

As shown in FIG. 4, the leading end of the nose 14 or a probe (not shown) on the nose 14 locates sealingly in a nozzle 28 of the drogue to enable the UAV 10 to receive fuel from the carrier aircraft 16 via the refuelling hose 23 (FIG. 5). The nose section 14 of the UAV 10 is held securely in the drogue by a latching device on the drogue generally indicated at 32.

Looking at FIG. 4, the pod 22 houses a drum 33 on which the hose 23 is wound when the drogue 24 is in the FIG. 4 position. The hose 23 receives fuel via a connection 34 from wing tanks 36, one of which is shown in FIG. 4. In the FIG. 4 position the drogue 24 lies against the outside of the pod 22 within a recess 38.

The pod 22 houses a power unit 40 for driving the drum 33 and for operating the latching devices 26, 27.

To launch the UAV 10, the latching devices 26, 27 are released by the unit 40 and the drum 33 is rotated so as to extend the hose 23 from the pod 22 so that the drogue 24 and the UAV 10 trail behind the carrier aircraft 16 as shown in FIG. 5. The UAV 10 provides sufficient power from its engine(s) so as to remain in a stable position when trailing behind the trailer aircraft 16.

Once in the FIG. 5 position, the latching mechanism 32 is released so as to launch the UAV 10 which then commences its mission instructions.

On completion of its mission instructions, the UAV 10 can either return to the carrier aircraft 16 for refuelling or for recovery and storage. If the UAV 10 requires refuelling, it will dock in the extended drogue 24 as shown in FIG. 5 and fuel will be transferred from the a carrier aircraft 16 through the hose 23 through the UAV 10. The UAV 10 can then detach and commences further mission instructions. If the UAV 10 is to be returned to a stowed position on the carrier aircraft 16, UAV 10 docks in the drogue 24 and latches by means of latching device 32 as shown in FIG. 5 and the hose 23 is retracted by rotating the drum 33 so as to draw the UAV 10 towards the pod 22. The UAV 10 again provides sufficient power during the operation to remain in a stable position. Once the FIG. 3 position has been reached the latching device 26 and 27 are reconnected to the UAV 10 so as to hold the UAV securely in place beneath the wing 20.

A suitable drogue 24 for use in the present invention is described in our UK Patent Application entitled A Drogue for In-Flight Refuelling (Ref. XA1476) filed simultaneously herewith and the reader is directed to that patent application for details.

As the UAV 10 is both launched and recovered when the carrier aircraft is airborne, the UAV does not require an undercarriage and associated take-off and landing systems.

What is claimed is:

1. A system for the airborne launch refuelling and recovery of an aircraft from/by a larger carrier aircraft and for refuelling and recovering the aircraft, the system comprising a holder on the carrier aircraft to which the aircraft is detachably connectable, and an extendible and retractable refuelling device mounted on or in the holder detachably connectable to the aircraft, whereby to launch the aircraft the aircraft is disconnected from the holder and the refuelling device is extended with the aircraft detachably connected thereto to cause the aircraft to trail behind the carrier aircraft and the refuelling device is disconnected from the trailing aircraft, the system enabling the aircraft to be refuelled in flight by connecting the aircraft in flight to the extended refuelling device and passing fuel from the carrier aircraft to the aircraft through the refuelling device, the aircraft also being recoverable by connecting the aircraft in flight to the extended refuelling device, retracting the refuelling device with the aircraft connected thereto and reconnecting the aircraft to the carrier aircraft.

2. A system according to claim 1 in which the refuelling device is in the form of a hose having means thereon for connection to the aircraft.

3. A system according to claim 2 in which the means on the hose is in the form of a drogue.

4. A system according to claim 3 in which the hose is wound on a drum, the drum being rotatable to enable the hose to unwind therefrom to extend the refuelling device.

5. A system according to claim 1 in which the holder has at least one latching device thereon for detachably connecting the aircraft to the holder.

6. A system according to claim 1 in which part of the carrier aircraft adjacent the holder has a latching device thereon for detachably connecting the aircraft to the carrier aircraft.

7. A system according to claim 4 in which a drive unit is provided for operating the drum and/or the or each latching device on the holder.

8. A system according to claim 1 in which a latching device is provided for detachably connecting the aircraft to the refuelling device.

9. A system according to claim 1 in which the holder is detachably connectable to the carrier aircraft.

10. A system according to claim 1 in which the aircraft is an unmanned aerial vehicle.

11. A system according to claim 2 in which the hose is wound on a drum, the drum being rotatable to enable the hose to unwind therefrom to extend the refueling device.

* * * * *